United States Patent
Lang et al.

[19]

[11] Patent Number: 5,963,127
[45] Date of Patent: Oct. 5, 1999

[54] CONTROL EQUIPMENT FOR DIFFICULT TO SEE OR BLIND SPOT AREAS AROUND VEHICLES, AND RELATED METHOD

[75] Inventors: Heinrich Lang, Ergersheim; Wolfgang Seiboth, Bad Windsheim, both of Germany

[73] Assignee: Mekra Lang GmbH & Co. KG, Ergersheim, Germany

[21] Appl. No.: 08/932,040

[22] Filed: Sep. 17, 1997

[30] Foreign Application Priority Data

Oct. 7, 1996 [DE] Germany ............................. 29617413

[51] Int. Cl.$^6$ .................................................. B60Q 1/00
[52] U.S. Cl. .................... 340/436; 340/435; 340/903; 340/441; 180/167
[58] Field of Search .................................... 340/436, 903, 340/435, 522, 438, 441; 180/167, 169

[56] References Cited

U.S. PATENT DOCUMENTS

| 3,662,328 | 5/1972 | Spivak | 340/903 |
|---|---|---|---|
| 5,325,096 | 6/1994 | Pakett | 342/70 |
| 5,339,075 | 8/1994 | Abst et al. | 340/903 |
| 5,583,495 | 12/1996 | Lulu | 340/904 |

FOREIGN PATENT DOCUMENTS

| 8501114 | 3/1985 | European Pat. Off. . |
|---|---|---|
| 0370965A2 | 5/1990 | European Pat. Off. . |
| 0381016A1 | 8/1990 | European Pat. Off. . |
| 9405525 | 3/1994 | European Pat. Off. . |
| 0591743A1 | 4/1994 | European Pat. Off. . |
| 0673802A1 | 9/1995 | European Pat. Off. . |
| 9525322 | 9/1995 | European Pat. Off. . |
| 3322528A1 | 1/1985 | Germany . |
| 3827879C1 | 8/1989 | Germany . |
| 3902852A1 | 8/1990 | Germany . |
| 92110010 | 2/1994 | Germany . |
| 4228794A1 | 3/1994 | Germany . |
| 29518301 | 6/1996 | Germany . |
| 367735 | 3/1991 | Japan . |
| 4243638 | 8/1992 | Japan . |
| 4368241 | 12/1992 | Japan . |
| 0723488 | 8/1995 | Japan . |
| 07304390 | 11/1995 | Japan . |

OTHER PUBLICATIONS

English Language Abstract for Japanese Patent No. 07223488 A, Published Aug. 22, 1995.

English Language Abstract for Japanese Patent No. 3–67735, Published Mar. 22, 1991.

English Language Abstract for Japanese Patent No. 4–243638, Published Aug. 31, 1992.

English Language Abstract for Japanese Patent No. 4–368241, Published Dec. 21, 1992.

English Language Abstract for Japanese Patent No. 07304390 A, Published Nov. 21, 1995.

Primary Examiner—Donnie L. Crosland
Attorney, Agent, or Firm—Dority & Manning, P.A.

[57] ABSTRACT

A control device for vehicles includes a sensor mounted to the vehicle for detecting an object in a monitored zone adjacent the vehicle and providing a responsive output signal when an object is detected in the monitored zone; a signaling device mounted to the vehicle for providing a speed output signal indicative of a speed of travel of the vehicle; a control unit mounted to the vehicle for receiving sensor output signals and speed output signals; and a warning device mounted to the vehicle for providing a warning signal to a driver of the vehicle, the control unit controlling the warning device to provide the warning signal responsive to the sensor output signal and the speed output signal so that the warning device provides a warning signal only when the sensor detects an object in the monitored zone and the signaling device provides a speed output signal indicating that the speed of the vehicle is below a predetermined value. A related vehicle and method are also disclosed.

20 Claims, 2 Drawing Sheets

CONTROL EQUIPMENT FOR DIFFICULT TO SEE OR BLIND SPOT AREAS AROUND VEHICLES, AND RELATED METHOD

BACKGROUND OF THE INVENTION

1. Field of the Invention

The invention relates to a control equipment for difficult to see or blind spot areas around vehicles, in particular for the passenger's side of utility vehicles or for the blind spot in front of the vehicle.

2. Background Art

A control equipment of the generic type exclusively for mirror blind spots is known for instance from DE 44 10 620 A1, and comprises a radiation sensor for example in the form of an ultrasonic or infrared sensor for the detection of any object within the controlled zone. Furthermore, a control unit, standard for such sensors, is provided for the operation of the sensor and the processing of the signals generated by the sensor. A warning signaler perceivable by the driver is coupled with this control unit, signaling to the driver any reaction of the sensor to an object sensed in the controlled zone. Fundamentally, this type of control equipment makes it possible to detect any road users, such as cyclists, motorcyclists or pedestrians that are in the blind spot of the external rearview mirror on the passenger's side and to draw the driver's attention to them. Problems are however posed by the fact that the sensors used for the control equipment conventionally react to motion, the sensor of course not being able to select whether the object to be sensed moves relative to the vehicle or whether the vehicle moves relative to an object. In this regard, when the vehicle is driven, the known control equipment will also react to any obstacles along the road, such as traffic signs and lights or the like. As a result, the warning signaler is often activated unnecessarily. This has a dangerous habit-forming effect on the driver, who will pay less and less attention to the warning signaler the longer he uses the control equipment, which may result in the signaler no longer being of any practical importance.

OBJECTS AND SUMMARY OF THE INVENTION

It is the object of the invention to improve the control equipment in such a way that the essential warning function is preserved.

This object is attained by the control equipment being designed such that the sensor and/or the warning signaler only works in a range of speed between standstill and a given limit speed. As a result of this design, the control equipment will only be activated in the case of circumstances that are critical from a safety point of view, for instance when stopping or starting at a traffic light or when turning right, in which cases many serious accidents have happened, if a cyclist or motorcyclist passing on the passenger's side of a utility vehicle has not been noticed by the driver.

A preferred range of speed ranges from the standstill of the vehicle to a limit speed of 15 km/h to 30 km/h, since—as statistics show—the majority of accidents, which are to be avoided by the control equipment, happen in this range of speed.

The rearview mirror on the passenger's side is a preferred place for the installation of the sensor for the control of the passenger side, integration of the sensor in the bottom edge of the mirror housing being favorable with a view to the accessibility of the zone to be controlled on the passenger's side of a utility vehicle.

Radiation sensors in the form of infrared motion sensors or ultrasonic sensors can be employed, which are standard for similar controlling tasks—for instance in the monitoring of buildings, in alarm systems or the like.

The warning signaler can be an optical and/or acoustic signaler. The optical signaler can be incorporated in the dashboard of the vehicle and/or the mirror.

Further features, details and advantages of the invention will become apparent from the ensuing description of exemplary embodiments, taken in conjunction with the drawings.

DESCRIPTION OF THE PREFERRED EMBODIMENTS

Figure 2:
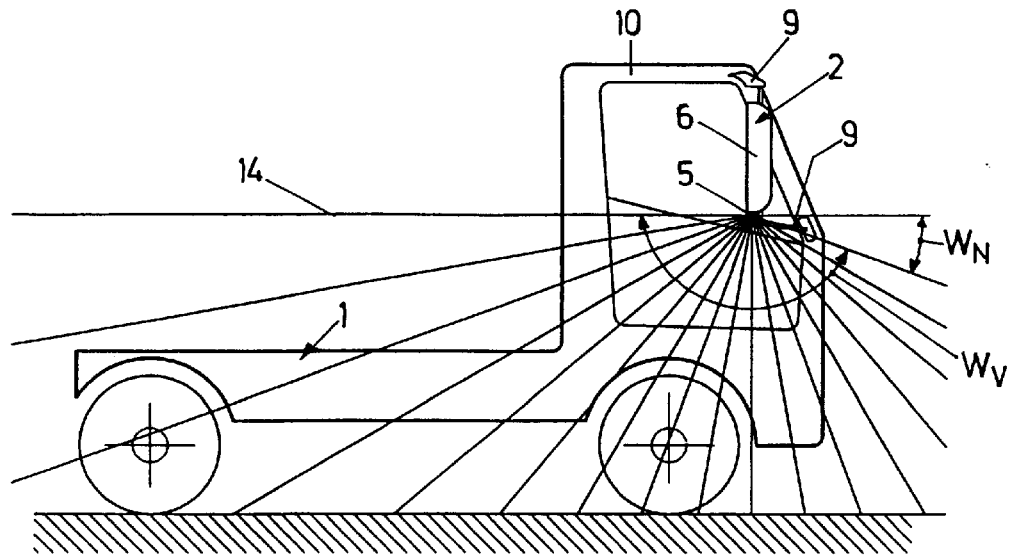
FIG. 2 is a lateral view of the utility vehicle of FIG. 1.

Reference will now be made in detail to the presently preferred embodiments of the invention, one or more examples of which are illustrated in the drawings. Each example is provided by way of explanation of the invention, and not meant as a limitation of the invention. For example, features illustrated or described as part of one embodiment can be used on another embodiment to yield yet another embodiment. It is intended that the present invention include such modifications and variations.

Figure 1:
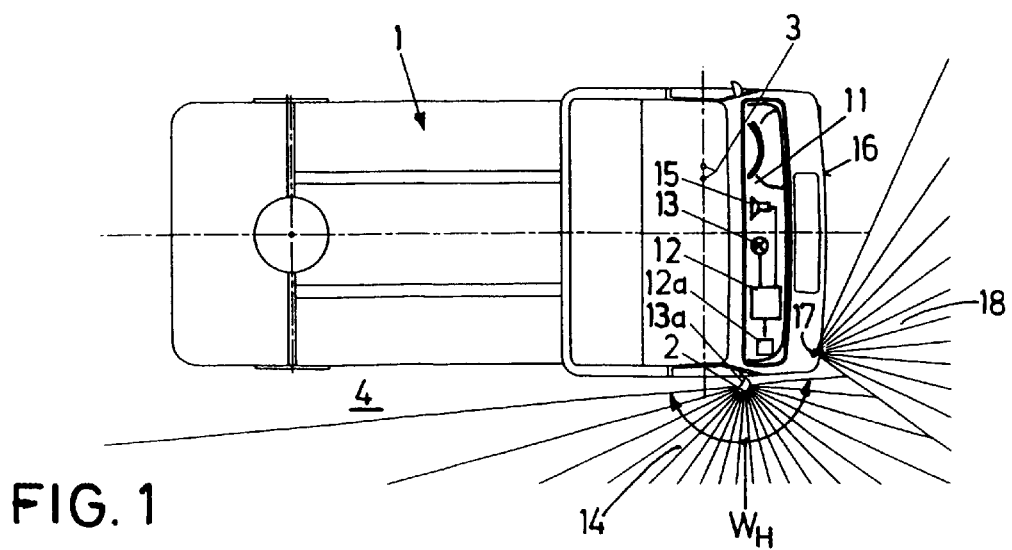
FIG. 1 is a diagrammatic plan view of a utility vehicle with control equipment according to the invention.

The utility vehicle diagrammatically illustrated in FIGS. 1 and 2 in the form of an articulated road train 1 comprises an external rearview mirror 2 on the passenger's side, by means of which the driver symbolized by the two points 3 representing his eyes visually oversees the zone adjoining the passenger's side of the utility vehicle. The zone visible at a glance into the mirror is restricted as known; for instance, visual monitoring of the zone under the mirror and on a level with the driver's cabin is not possible.

Figure 5:
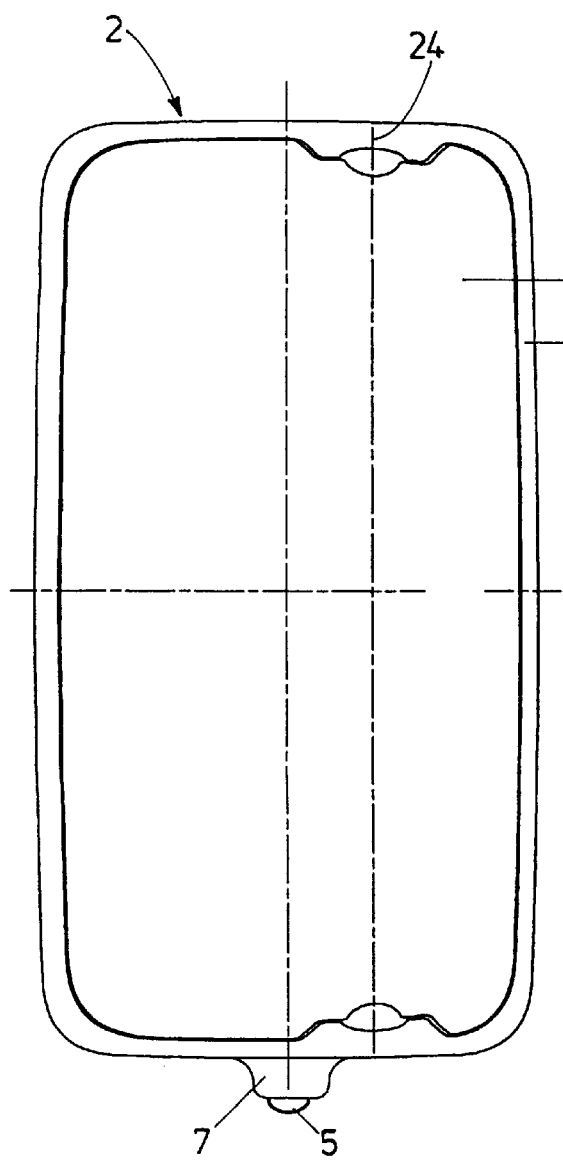
FIG. 5 is a view of the rearview mirror seen from the direction of the arrow V of FIG. 4.
Figure 4:
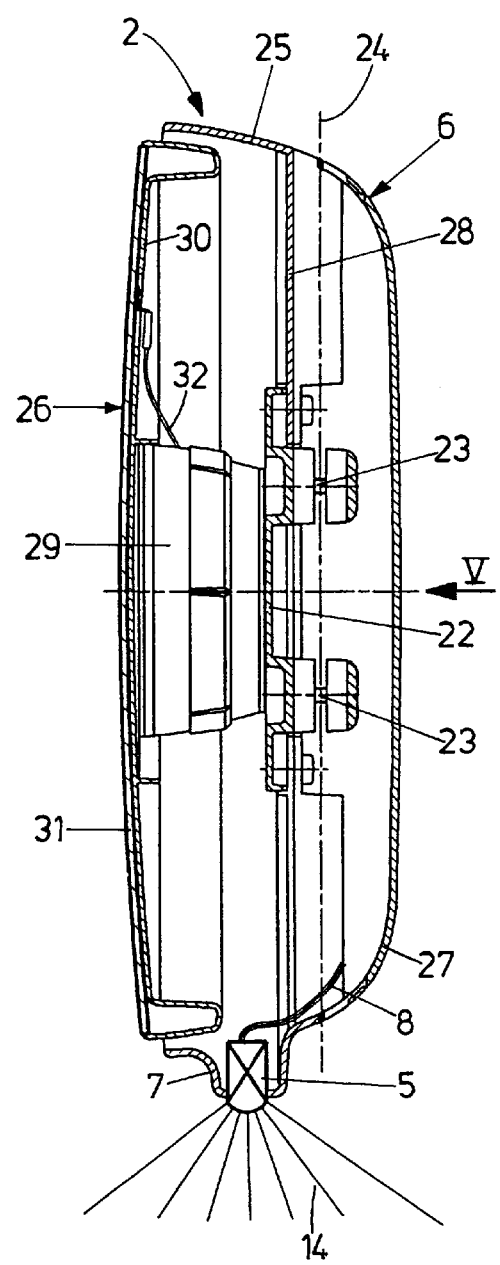
FIG. 4 is a vertical section through an external rearview mirror of a utility vehicle with an integrated sensor.

For the monitoring of the entire zone 4 on the passenger's side of the utility vehicle to be possible, control equipment is incorporated in the utility vehicle, having an infrared motion sensor 5 as a main element. As seen in FIGS. 4 and 5, this motion sensor 5 is integrated in a downwards bearing projection 7 on the lower edge of the mirror housing 6. A combined control and signaling cable 8, which is guided through the mirror housing 6 via the mirror support 9 to the driver's cabin 10 of the utility vehicle, serves to connect the infrared sensor with a control unit 12 located in the dashboard 11. A warning light 13 disposed within the driver's view is coupled with the control unit 12. Another warning light 13a may be disposed on the edge, turned towards the driver, of the mirror housing 6—which is not shown in detail.

The radiation field 14 of the infrared motion sensor 5 is roughly outlined by fan-shaped hatchings in FIGS. 1, 2, and 4. Related to the horizontal plane (FIG. 1), it covers an angle $W_H$ of 180°, the limits of which are approximately parallel to the lengthwise direction of the vehicle. Related to the vertical plane (FIG. 2), the radiation field 14 covers an angle $W_V$ of approximately 160°, the delimitation of the radiation field to the front being inclined downwards relative to the horizontal by an angle $W_N$ of approximately 20°.

As a result of the radiation field 14 specified, the entire zone on the passenger's side of the utility vehicle is monitorable (not only the blind spots of the rearview mirror 2). If, for instance, the utility vehicle 1 stops at a traffic light and a cyclist arrives in this zone, this will be registered by the infrared motion sensor 5 which will pass a corresponding signal to the control unit 12. The control unit 12 activates the warning light 13 (or 13a) and possibly an additional signal buzzer 15 available in the dashboard, causing the driver of the utility vehicle to look into the rearview mirror 2 and to notice the cyclist. Corresponding warning mechanisms take place when the utility vehicle turns right for instance at a road junction, in which case the driver might overlook a cyclist driving on the right of the utility vehicle. This cyclist is also detected by the infrared motion sensor 5 and signaled to the driver by the control equipment in the way described.

So as to prevent the driver from being flooded by warning signals as mentioned at the outset, the control equipment is designed in such a way that, based on the control unit 12, the infrared motion sensor 5, the warning light 13 (or 13a) and the signal buzzer 15 are only activated when the utility vehicle 1 moves at a speed between standstill of the vehicle and a limit speed of 15 km/h to 30 km/h, and preferably about 25 km/h. To this end, a signal representative of the vehicle speed is supplied to the control unit 12 by a signaling device 12a in a manner not shown in detail.

As additionally outlined in FIG. 1, another infrared motion sensor 17 is disposed at the front 16 of the utility vehicle 1, the radiation field 18 of which surveys the blind spot in front of the vehicle. This infrared motion sensor 17 too is operated via the control unit 12.

Figure 3:
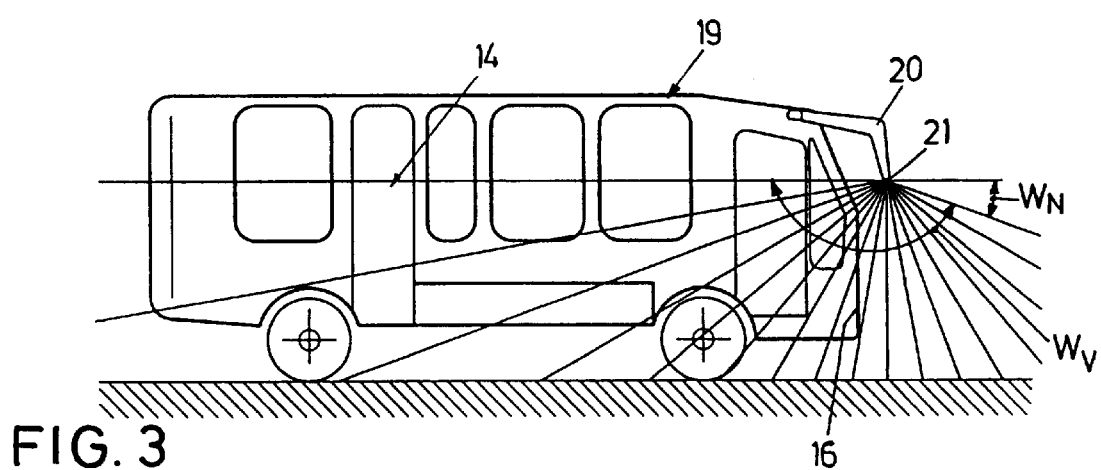
FIG. 3 is a diagrammatic lateral view of a touring bus with control equipment according to the invention.

FIG. 3 illustrates a touring bus 19 with a main mirror 20 of modern design disposed on the passenger's side and extending far ahead beyond the vehicle front 16. As far as its radiation field is concerned, the infrared motion sensor 21 disposed at the lower end of the main mirror 20 can be designed such that it surveys the blind spot in front of the vehicle as well as the zone along the passenger's side. In this regard, the sensed angle $W_H$ is approximately 270° relative to the horizontal plane.

For the sake of completeness and in conclusion, the structure of the external rearview mirror 2 is explained in short, taken in conjunction with FIGS. 4 and 5. A central part consists in a bearing plate 22 which, by way of two clamps 23, is joined to a mirror rod 24 only roughly outlined by dashes in FIG. 4. From the side turned towards the direction of motion, the bottom 28 of a housing member 25 is screwed on the bearing plate 22, the housing member 25 encasing the virtual mirror component 26 in the way of a frame. The bearing projection 7 for the infrared motion sensor 5 is molded on the lower edge of this housing member 25.

From the side turned towards the direction of motion, the cover 27 for the clamps 23 and the bottom 28 of the housing member 25 is locked into place on the housing member 25.

The mirror component 26 is joined to the bearing plate 22 by way of an electric-motor driver adjusting unit 29. It consists of a mirror supporting plate 30 on which the actual mirror glass 31 is glued with a heating foil (not shown) placed in between. FIG. 4 illustrates the electric connection 32 of the mirror heating.

It will be apparent to those skilled in the art that various modifications and variations can be made in the present invention without departing from the scope and spirit of the invention. It is intended that the present invention include such modifications and variations as come within the scope of the appended claims and their equivalents.

What is claimed is:

1. A control device for vehicles comprising:
    a sensor mounted to the vehicle for detecting an object in a monitored zone adjacent the vehicle and providing a responsive output signal when an object is detected in the monitored zone;
    a signaling device mounted to the vehicle for providing a speed output signal indicative of a speed of travel of the vehicle;
    a control unit mounted to the vehicle for receiving sensor output signals and speed output signals; and
    a warning device mounted to the vehicle for providing a warning signal to a driver of the vehicle, the control unit controlling the warning device to provide the warning signal responsive to the sensor output signal and the speed output signal so that the warning device provides a warning signal only when the sensor detects an object in the monitored zone and the signaling device provides a speed output signal indicating that the speed of the vehicle is below a predetermined value.

2. The control device of claim 1, wherein the predetermined value is from 15 km/h to 30 km/h.

3. The control device of claim 1, wherein the predetermined value is about 25 km/h.

4. The control device of claim 1, wherein the sensor is mounted to an external rearview mirror secured to a passenger's side of the vehicle.

5. The control device of claim 1, wherein the sensor is a radiation sensor.

6. The control device of claim 5, wherein the radiation sensor is an infrared motion sensor.

7. The control device of claim 1, wherein the sensor is an ultrasonic sensor.

8. The control device of claim 1, wherein the warning device is an optical signaler.

9. The control device of claim 8, wherein the optical signaler is mounted to at least one of a dashboard of the vehicle and an external rear-view mirror.

10. The control device of claim 1, wherein the warning device is an acoustic signaler.

11. The control device of claim 1, wherein the monitored zone is disposed in at least one of a side of the vehicle and a front of the vehicle.

12. A control device for vehicles comprising:
    a vehicle;
    a sensor mounted to the vehicle for detecting an object in a monitored zone adjacent the vehicle and providing a responsive output signal when an object is detected in the monitored zone;
    a signaling device mounted to the vehicle for providing a speed output signal indicative of a speed of travel of the vehicle;
    a control unit mounted to the vehicle for receiving sensor output signals and speed output signals; and
    a warning device mounted to the vehicle for providing a warning signal to a driver of the vehicle, the control unit controlling the warning device to provide the warning signal responsive to the sensor output signal and the speed output signal so that the warning device provides a warning signal only when the sensor detects an object in the monitored zone and the signaling device provides a speed output signal indicating that the speed of the vehicle is below a predetermined value.

13. The control device of claim 12, wherein the sensor is mounted to an external rearview mirror secured to a passenger's side of the vehicle.

14. The control device of claim 12, wherein the sensor is mounted to a front of the vehicle.

15. The control device of claim 12, wherein the sensor is mounted to an external mirror secured to and extending from the front of the vehicle.

16. The control device of claim 12, further including a second sensor, the first sensor monitoring a monitored zone adjacent a side of the vehicle and the second sensor monitoring a second monitored zone in the front of the vehicle.

17. A method for monitoring zones adjacent a vehicle, the method comprising the steps of:

detecting an object in a monitored zone adjacent the vehicle and providing a responsive sensor output signal when an object is detected in the monitored zone;

providing a speed output signal indicative of a speed of travel of the vehicle;

receiving sensor output signals and speed output signals; and providing a warning signal to a driver of the vehicle responsive to the sensor output signal and the speed output signal so that the warning signal is provided only when an object is detected in the monitored zone and the speed output signal indicates that the speed of the vehicle is below a predetermined value.

18. The method of claim 17, wherein the predetermined value is from 15 km/h to 30 km/h.

19. The method of claim 17, wherein the predetermined value is about 25 km/h.

20. The method of claim 17, wherein the monitored zone is disposed in at least one of a side of the vehicle and a front of the vehicle.

\* \* \* \* \*